United States Patent Office 3,559,080
Patented Jan. 26, 1971

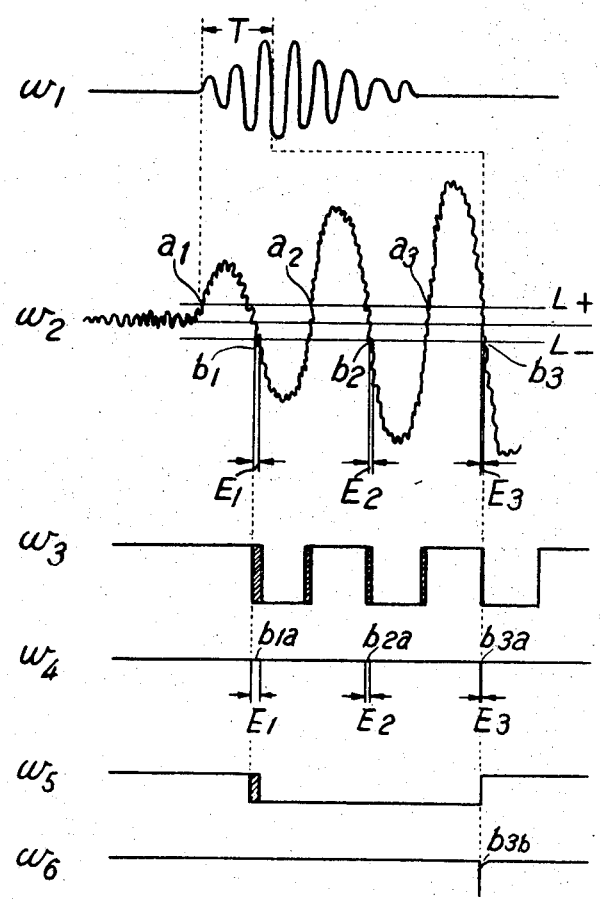
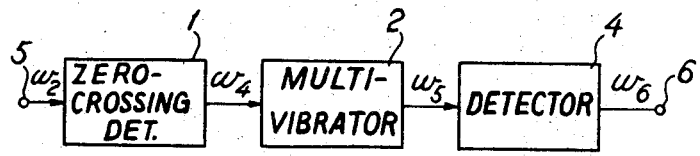
Fig. 2A
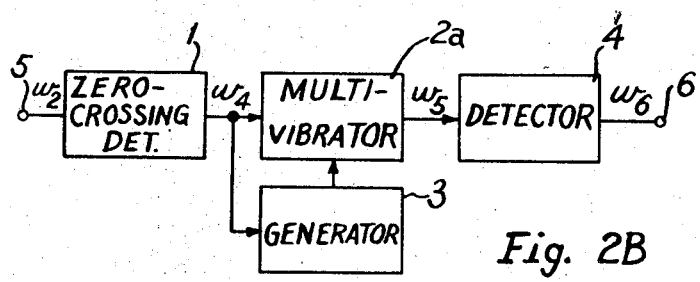
Fig. 2B

3,559,080
SIGNAL RECEIVING SYSTEM
Yasuhiro Kobori and Kunio Murakami, Tokyo-to, Japan, assignors to Kaijo Denki Kabushiki Kaisha, also known as Kaijo Denki Co., Ltd., Tokyo-to, Japan, a joint-stock company of Japan
Filed Sept. 12, 1967, Ser. No. 667,171
Int. Cl. G01r 23/02
U.S. Cl. 328—136                                    5 Claims

ABSTRACT OF THE DISCLOSURE

A receiving system for detecting the incoming instant of an AC signal, where the setting of a multivibrator is carried out when the instantaneous level of the signal exceeds a predetermined threshold level and the resetting of the multivibrator is carried out when the number of zero-crossings of the signal reaches a predetermined number, the system detecting the incoming instant of the signal at the resetting instant of the multivibrator.

This invention relates to a signal receiving system and more particularly to a receiving system for detecting the incoming instant of an AC signal, such as ultrasonic pulsive waves in an ultrasonic anemometer or an ultrasonic non-destructive inspector.

In a system of this type, it is necessary to detect correctly (without "jitter") the incoming instant of an AC signal. However, if the incoming signal has a relatively low signal-to-noise ratio, the instantaneous level of the incoming signal as well as the zero level fluctuates in accordance with included noises. Accordingly, it is usual that the preciseness of detecting the incoming instant thereof is reduced considerably in conventional systems of this type.

An object of this invention is to provide a signal receiving system capable of detecting correctly the incoming instant of an AC signal even if the AC signal has a relatively low signal-to-noise ratio.

Another object of this invention is to provide a signal receiving system suitable to detect the incoming instant of an AC signal in an ultrasonic device.

Said objects and other object of this invention can be attained by the signal receiving system of this invention, comprising a zero-crossing detector for detecting zero-crossing instants of the AC received signal and for producing zero-crossing pulses in rseponse to the zero-crossing instants, a multivibrator to be set by the first pulse of the zero-crossing pulses and to be reset in synchronism with one of zero-crossing pulses which coincides with a predetermined order number of cycle of the received signal, and a detector for detecting the resetting instant of the multivibrator as the incoming instant.

The novel features of this invention are set forth with particularity in the appended claims, however this invention, as to its construction and operation together with other objects and advantages thereof, may best be understood by reference to the following description, taken in connection with the accompanying drawings, in which the same parts are designated by the same characters, numerals and symbols as to one another, and in which:

FIG. 1 is wave-form diagrams for describing the principle and operation of this invention;

FIG. 2A is a block diagram illustrating an embodiment of this invention;

FIG. 2B is a block diagram of another embodiment;

Figure 3:
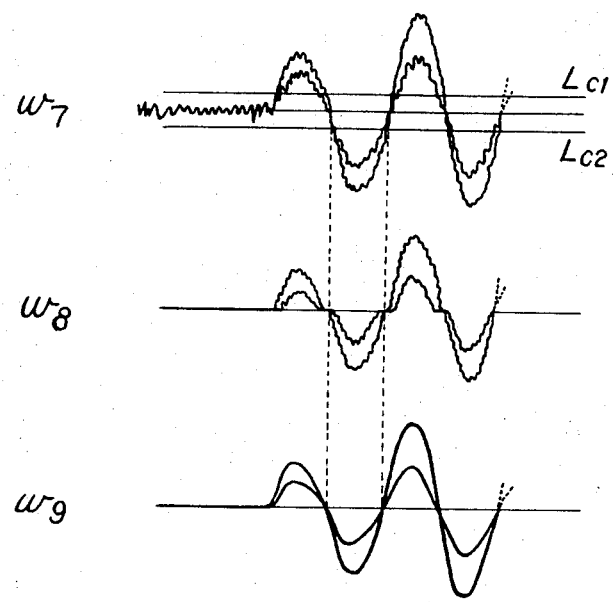
FIG. 3 is wave-form diagrams for describing another feature of this invention.

Referring to FIG. 1, the principle of this invention will first be described in comparison with the conventional system. A wave $w_1$ is an example of an AC receiving signal accompanying with transient distortion which is caused by high Quality Factors (Q) of an electro-acoustic transducer and/or a receiving circuitry as well-known in the art. In actual cases, noises are included in the received signal as illustrated by a wave $w_2$ of FIG. 1. Detection of zero-crossing instants of the wave $w_2$ is carried out by use of a predetermined threshold level L+ or L—. In this case, detected zero-crossings of the wave $w_2$ have deviations $E_1$, $E_2$, $E_3$ ... which fluctuate in accordance with rising slopes of the wave $w_2$ and have a minimum value at the largest peak value of the wave $w_2$.

In conventional receiving systems, since a first cycle of the wave $w_2$ is detected by use of the threshold level L+ or L—, an instant $a_1$ or $b_1$ is detected as the incoming instant of the received wave $w_2$. However, the instant $a_1$ or $b_1$ has a relatively large deviation ($E_1$ or $E_2$) as mentioned above because of the included noise. Accordingly, the preciseness of detecting the incoming instant for a predetermined cycle of the received wave $w_2$ is not very high.

To increase the above-mentioned preciseness, the system of this invention is provided with a multivibrator, the setting of which is carried out in response to a first zero-crossing (e.g. the instant $a_1$). The resetting of the multivibrator is carried out as shown in a wave $w_5$ when a predetermined number of zero-crossings (e.g.; $b_{1a}$, $b_{2a}$ and $b_{3a}$ of a wave $w_4$) inclusive of the first zero-crossing are detected. The resetting instant of the multivibrator is determined as the incoming instant of the received wave $w_2$ (more particularly, as the incoming instant of the predetermined cycle of the received wave $w_2$). A pulse $b_{3b}$ of a wave $w_6$ is derived from the multivibrator as the incoming instant. At the instant $b_3$, the deviation value ($E_3$) is very small as understood from the above-description. Accordingly, the detection operation in the system of this invention can be carried out with high preciseness.

Referring to FIG. 2A, an embodiment of this invention for realizing the above-mentioned principle will be described. This embodiment comprises a zero-crossing detector 1, a monostable multivibrator 2, and a detector 4. The zero-crossing detector 1 detects the zero-crossings of cycles of the received wave $w_2$ and produce zero-crossing pulses $b_{1a}$, $b_{2a}$, $b_{3a}$ ... in response to the respective zero-crossings.

These pulses are applied to the monostable multivibrator 2 to set its state. The resetting of the monostable multivibrator 2 is carried out when the number of zero-crossing pulses reaches a predetermined number which is determined so as to coincide with the order number of a maximum-level cycle of the received wave $w_2$. In other words, the monostable multivibrator 2 is so designed that its resetting instant is synchronized with one of the zero-crossing pulses $b_{1a}$, $b_{2a}$, $b_{3a}$ ... which coincides with the order number of maximum-level cycle of the received wave $w_2$, since the period of cycles of the received signal is usually known at the received side. The resetting instant is detected by the detector 4 which is composed of a differentiator and a rectifier connected in series by way of example.

The multivibrator circuit 2 may be replaced by a bistable multivibrator 2a as shown in FIG. 2B. In this case, however, a generator 3 is to be inserted in the resetting circuit of the multivibrator 2a to count the number of said zero-crossing pulses $b_{1a}$, $b_{2a}$, $b_{3a}$ . . . and to generate a reset pulse when the number of zero-crossing pulses reaches the predetermined number.

In the above-mentioned system, if the zero level of the received wave $w_2$ is further fluctuated by noise, the zero-crossings cannot be correctly detected regardless of the disturbance of noise. Accordingly, it is generally difficult to detect stably the incoming instant of the received wave. To make the detection operation of the incoming instant in the presence of noise more reliably, the system of this invention can be further provided with an arrangement illustrated in FIG. 4. This arrangement comprises a clipper 8 and a filter 9.

Figure 4:
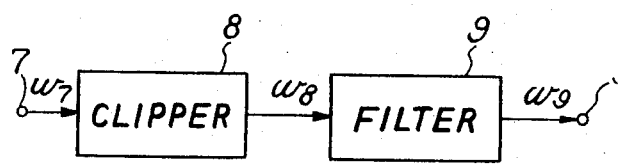
FIG. 4 is a block diagram illustrating an arrangement to be used in the system of this invention.

The operation of this arrangement will be described with reference to FIGS. 3 and 4. A received wave $w_7$ is applied from an input terminal 7 to the clipper 8, in which the received wave $w_7$ is clipped by use of clipping levels $L_{c1}$ and $L_{c2}$ exceeding the peak level of noise so as to produce a clipped wave $w_8$. This clipped wave $w_8$ is applied to the filter 9. This filter 9 has a pass-band through which the received wave $w_7$ can be passed but components higher than the frequency of the received wave $w_7$ cannot be passed. Accordingly, the higher components included in the wave $w_8$ are checked at the filter 9, and an output signal $w_9$ having a sinusoidal wave form and having no disturbance by noise can be derived from the filter 9. As understood from the illustration, zero-crossing instants of the output wave $w_9$ have no "jitter" even if the amplitudes of respective cycles of the wave $w_9$ are varied. The output signal $w_9$ is applied to the system shown in FIG. 2 through a terminal 5.

Figure 5:
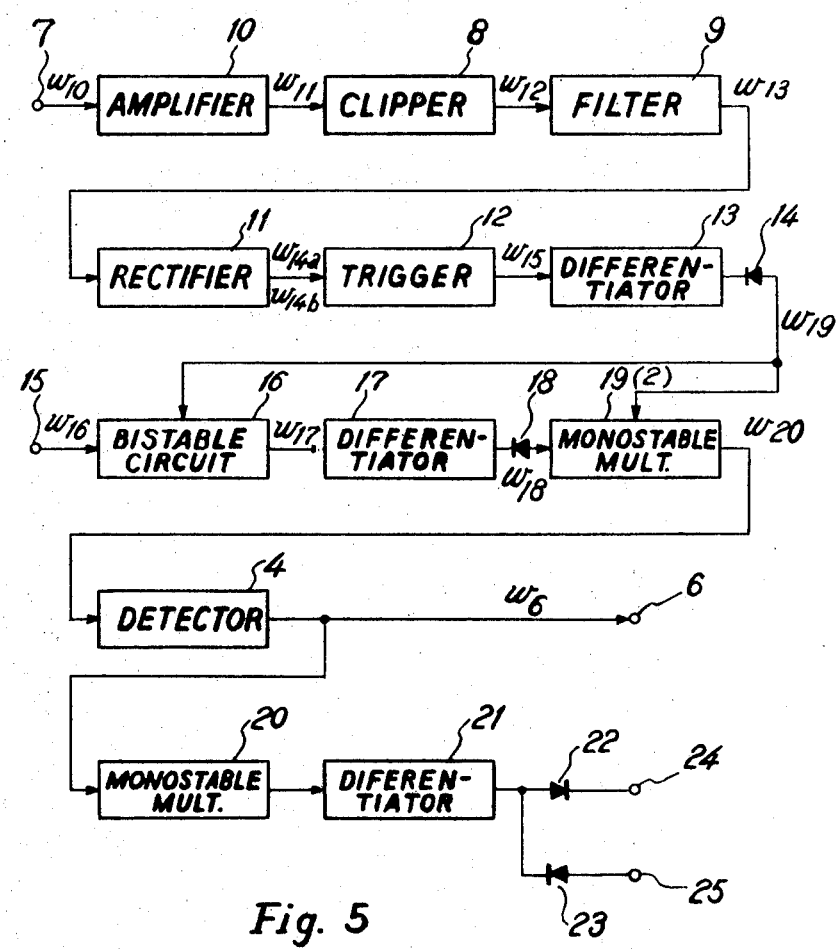
FIG. 5 is a block diagram illustrating an actual example of the system of this invention.
Figure 6:
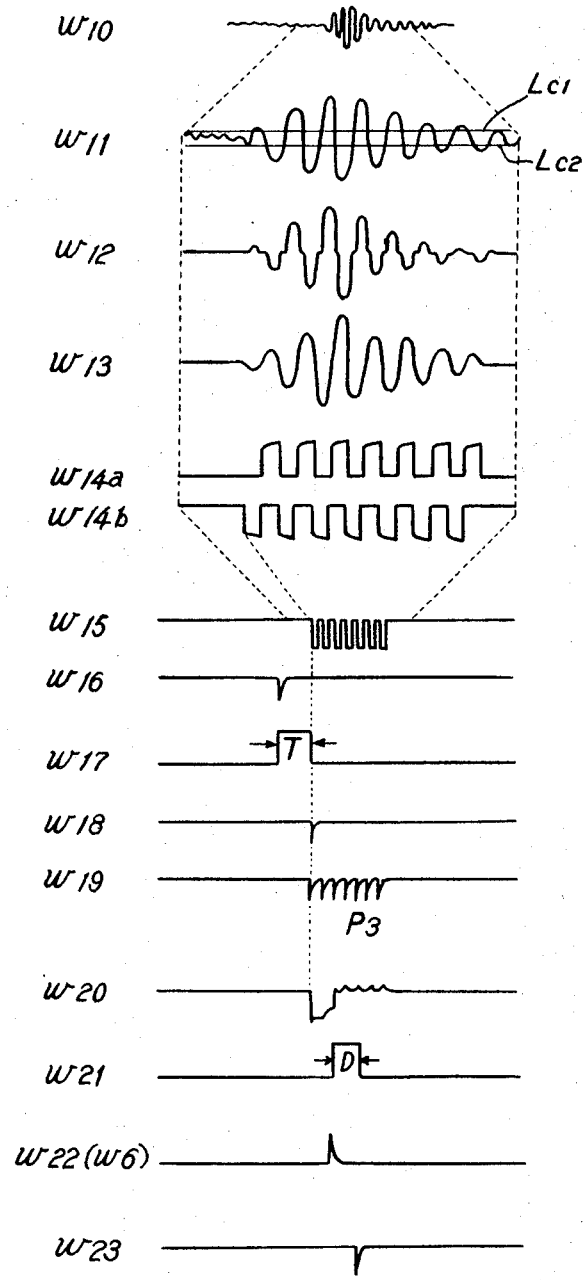
FIG. 6 is wave-form diagram for describing the operation of the example shown in FIG. 5.

Next, an actual embodiment of this invention to detect a received signal in an ultrasonic amemometer will be described with reference to FIGS. 5 and 6. In FIG. 5, the received wave $w_{10}$ is applied to an amplifier 10 through a terminal 7. The received wave $w_{10}$ is usually obtained by use of a receiver inclusive of an ultraonic-electric transducer (not shown). An amplified signal $w_{11}$ is applied to a clipper 8, in which the signal $w_{11}$ is clipped by use of clipping levels $L_{c1}$ and $L_{c2}$ to produce a clipped signal $w_{12}$. The clipped signal $w_{12}$ is applied to a bandpass filter 9, from which a signal $w_{13}$ having a sinusoidal wave form is obtained. The wave $w_{13}$ is amplified, if necessary, and rectified by a rectifier 11 so as to produce a wave $w_{14a}$ or $w_{14b}$. The rectified wave $w_{14a}$ or $w_{14b}$ is reshaped by a Schmitt trigger 12 as is shown by wave $w_{15}$. The reshaped wave $w_{15}$ is converted to a pulse signal $w_{19}$ by use of a differentiator 13 and a rectifier 14.

On the other hand, a control pulse $w_{16}$ is applied, through a terminal 15, to a bistable circuit 16 to set its state. In an actual ultrasonic anemometer, the control pulse $w_{16}$ is generated in response to a sending pulse. The bistable circuit 16 is reset by the first pulse of the pulse signal $w_{19}$. Accordingly, the bistable circuit 16 produce an output pulse $w_{17}$. The termination instant of the output pulse $w_{17}$ is derived from a combination circuit of a differentiator 17 and a rectifier 18 as shown by a pulse signal $w_{18}$. This pulse signal $w_{18}$ is applied to a monostable multivibrator 19 to set its state. Accordingly, noise disturbance occurring at times other than the duration T of the pulse signal $w_{17}$ can be prevented at the input of the monostable circuit 19.

The monostable multivibrator 19 is so designed that the resetting of this multivibrator 19 is synchronized with a pulse of the pulse signal $w_{19}$ which corresponds to a predetermined order number (e.g., third). A signal $w_{20}$ is an example of the output signal of the monostable multivibrator 19 where the resetting of the multivibrator 19 is synchronized with the third pulse $P_3$ of the pulse signal $w_{19}$. The termination instant of the signal $w_{20}$ is derived from the detector 4 as illustrated by the wave $w_6$ and mentioned with reference to FIGS. 1 and 2. The pulse signal $w_6$ is applied to a monostable multivibrator 20 to set its state. A pulse $w_{21}$ is obtained from the multivibrator 20, in which the duration D of the pulse $w_{21}$ is adjustable. The initial instant and the termination instant of the pulse $w_{21}$ are derived respectively from terminals 24 and 25 by use of a differentiator 21 and rectifiers 22 and 23. The duration D between pulses $w_{22}$ (i.e., $W_6$) and $w_{23}$ can be employed for compensating an error caused by spaces between sending transducers and receiving transducers in the ultrasonic anemometer.

As mentioned above, the incoming instant of the A.C. received signal can be correctly detected by the system of this invention. Accordingly, the system of this invention can be applied to a wide field of the art. For example, the signal receiving system in accordance with the present invention can advantageously be wired with a pulse duration discriminator of the kind disclosed in Kobori and Yakiji application S.N. 667,279, filed Sept. 12, 1967 (now abandoned and superceded by a continuation-in-part application S.N. 24,213, filed Mar. 31, 1970) to provide a reliable ultrasonic anemometer.

While we have described particular embodiments of our invention, it will of course be understood that we do not wish our invention to be limited thereto, since many modifications and changes may be made.

What we claim is:

1. A signal receiving system for detecting the incoming instant of a received AC signal, comprising a zero-crossing detector for detecting zero-crossing instants of the AC received signal and for producing zero-crossing pulses in response to the zero-crossing instants, a multivibrator connected to the zero-crossing detector so as to be set by the first pulse of the zero-crossing pulses and to be reset in synchronism with one of the zero-crossing pulses which coincides with a predetermined order number of cycles of the received signal, and a detector connected to the multivibrator for detecting the resetting instant of the multivibrator as the incoming instant.

2. A signal receiving system according to claim 1, in which the multivibrator is a monostable multivibrator.

3. A signal receiving system according to claim 1, in which the system further comprises a clipper for clipping the received signal by the use of a pair of clipping levels exceeding the peak level of incoming noise and a filter connected to the clipper for passing therethrough the received signal and for checking components higher than the frequency of the received signal, the output signal of the filter being applied to the zero-crossing detector.

4. A signal receiving system according to claim 1, in which the system further comprises means coupled with the multivibrator for checking the zero-crossing pulses applied to the multivibrator within an interval which just precedes the received signal.

5. A signal receiving system for detecting the incoming instant of a received AC signal, comprising:

a clipper for clipping the received signal by the use of a pair of clipping levels exceeding the peak level of incoming noise included in the received signal to produce a clipped, received signal, a filter connected to the output of the clipper for passing therethrough the clipped, received signal and for checking components higher than the frequency of the received signal to produce a filtered signal, a zero-crossing detector connected to the output of the filter for detecting zero-crossing instants of the filtered signal and for producing zero-crossing pulses in response to the zero-crossing instants, terminal means for receiving a control pulse generated before, by a desired time interval, the occurrence time of the first one of the zero-crossing pulses, a bistable circuit coupled to the terminal means and the zero-crossing detector so as to be set by the control pulse and reset by the first one of the zero-crossing pulses, a pulse generator connected to the bistable circuit for generating a setting pulse in response to the resetting of the bistable circuit, a monostable multivibrator connected to the zero-crossing detector and the pulse generator so as to be set by the setting pulse and reset in synchronism with one of the zero-crossing pulses which coincides with a predetermined order number of the zero-crossing pulses, and a detector connected to the monostable circuit for detecting the resetting instant of the monostable multivibrator as the incoming instant.

References Cited
UNITED STATES PATENTS 2,399,135   4/1946   Miller et al. _____ 328—39X DONALD D. FORRER, Primary Examiner J. ZAZWORSKY, Assistant Examiner U.S. Cl. X.R.

307—232; 328—140